APPARATUS FOR WOVEN SCREEN MEMORY DEVICES

Filed Nov. 12, 1963 6 Sheets-Sheet 1

DAVID R. BOLES
JOHN S. DAVIS
PAUL E. WELLS
INVENTORS

BY
Fraser and Bogucki
ATTORNEYS

April 9, 1968 D. R. BOLES ETAL 3,377,581

APPARATUS FOR WOVEN SCREEN MEMORY DEVICES

Filed Nov. 12, 1963 6 Sheets-Sheet 2

DAVID R. BOLES
JOHN S. DAVIS
PAUL E. WELLS
INVENTORS

BY Fraser and Bogucki
ATTORNEYS

APPARATUS FOR WOVEN SCREEN MEMORY DEVICES

Filed Nov. 12, 1963 6 Sheets-Sheet 3

DAVID R. BOLES
JOHN S. DAVIS
PAUL E. WELLS
INVENTORS

BY
Fraser and Bogucki
ATTORNEYS

APPARATUS FOR WOVEN SCREEN MEMORY DEVICES

Filed Nov. 12, 1963 6 Sheets-Sheet 4

DAVID R. BOLES
JOHN S. DAVIS
PAUL E. WELLS
INVENTORS

BY
Fraser and Bogucki
ATTORNEYS

DAVID R. BOLES
JOHN S. DAVIS
PAUL E. WELLS
INVENTORS

BY
Fraser and Bogucki
ATTORNEYS

DAVID R. BOLES
JOHN S. DAVIS
PAUL E. WELLS
INVENTORS

BY
Fraser and Bogucki
ATTORNEYS

United States Patent Office 3,377,581

Patented Apr. 9, 1968

3,377,581

APPARATUS FOR WOVEN SCREEN MEMORY DEVICES

David R. Boles, Van Nuys, John S. Davis, Glendale, and Paul E. Wells, Los Angeles, Calif., assignors, by mesne assignments, to The Bunker-Ramo Coporation, Stamford, Conn., a corporation of Delaware Filed Nov. 12, 1963, Ser. No. 322,872
23 Claims. (Cl. 340—174)

ABSTRACT OF THE DISCLOSURE

A woven screen memory weaving method wherein a loom is controlled to provide proper placement and relationship of various wires for the screen substrate and for control conductors. The weave pattern is suitable for a continuous or non-continuous woven stack of severable matrices. The wires, rods or insulating threads are woven around particular matrix peripheries to provide edge trim, open sections, and a plurality of separation sectors for ready separation for further assembly of control wires, dummy wires, and substrate wires. Plane trim also is provided. Planes suitable for cutting and stacking in a complete memory are produced by a continuous weave of a plurality of matrices. Features include a skip weave for cancellation of magnetic shuttle noise, dummy "conductors" to increase cell density and buffer cells between adjacent storage cells to prevent intercellular interference and improve signal to noise ratio in operation.

This invention relates to information storage devices and more particularly to such devices which are of the woven wire screen memory type.

Modern computers and data processing systems depend to a considerable degree upon information storage devices. For obvious reasons, such information storage devices are referred to as memories. In most cases it is desired that a suitable memory exhibit the properties of large storage capacity in small volume with rapid and easy access to stored information in both the storage and readout portions of the operating cycle. In addition, it is desirable that such a memory device be economical to produce and absolutely reliable in operation.

A significant proportion of previously known memory devices depend upon the property of magnetic remanence as the storage mechanism, and considerable development effort has gone into providing memory devices employing magnetic cores, magnetic thin films and the like. Although the magnetic core is seemingly satisfactory as an individual bit storage device, it is difficult to fabricate a large number of magnetic cores in a suitable memory arrangement. As the size of the cores is reduced in order to meet space requirements, they become increasingly difficult to handle, and problems of fabrication by individually threading literally thousands of the toroids in a suitable storage array become formidable. Thin magnetic films are not subject to the same problems, but do not possess all of the desirable qualities presented by magnetic cores. Fortunately, however, there has recently been developed a particular arrangement, referred to as a screen memory, which gives promise of combining the desirable magnetic properties of a magnetic core with an ease of fabrication comparable to the most favorable previously known storage arrangements.

A basic form of the screen memory comprises a grid or screen structure, such as an ordinary copper window screen, in which are threaded various conductors which may be connected to associated equipment for controlling the storage arrangement. The screen structure serves as a substrate upon which a suitable magnetic coating or layer is deposited. Such an arrangement provides a large number of tiny individual storage cells, each of which may comprise an individual screen aperture threaded by suitable control conductors and surrounded by a closed loop of magnetic remanent material. The result is an extremely compact, rugged and reliable memory structure which is adaptable to fabrication by mass production techniques.

Although the described screen memory arrangement may be fabricated by initially plating a magnetic layer on the screen substrate and then threading selected apertures therein with suitable conductors to define the various individual storage cells, greater advantages from the fabrication standpoint are to be derived if the screen substrate and the control conductors to be threaded therein are woven concurrently. Although the weaving of both substrate and control wires in a screen structure which may be utilized in memory devices materially simplifies the fabricating of such arrangements, particular pains must be taken in developing the weaving techniques which are appropriate for the structure desired. It will be appreciated that the woven screen memory structures differ substantially in several particulars from either screen or fabric which has heretofore been produced by weaving on a loom. For example, in the woven screen structures of the present invention, the nature of the devices dictates that certain of the woven wires be readily segregated and identifiable after the weaving step is completed. Such a requirement has not been imposed on any previously known woven structures.

Accordingly, it is a general object of the present invention to provide improved fabrication methods and apparatus for screen memory devices.

It is a particular object of the present invention to provide screen memory devices which may be fabricated on automatic weaving looms.

It is a more particular object of the present invention to provide a woven structure for a woven screen memory device wherein the individual conductors may be readily separated and identified after the weaving step is completed.

It is a further object of the present invention to provide for the predetermined spacing and location of particular conductors in a woven screen memory structure.

An additional object of the present invention is to develop particular weave patterns for loom fabrication which are suitable for magnetic screen memory structures.

Another object of the present invention is to provide a method for controlling a loom for weaving wire screen memory structures which may be folded, rolled or otherwise stacked in particular configurations after fabrication is completed.

Considered briefly, the present invention comprises specific devices and methods for the fabrication thereof wherein screen memory structures are woven in particular configurations on a loom. In accordance with the present invention, machine woven planes are provided by simultaneously weaving bare substrate wires and insulated conductors on an automatic or manual loom in a predetermined matrix, after which the resulting planes may be chemically processed to provide the finished magnetic screen memory devices. Because of the mechanics of the fabricated structure, it is usually desirable to provide lines of buffer cells between adjacent storage cells. The buffer cells serve to prevent interference from one storage cell to the next, thus improving the signal-to-noise ratio during operation. A buffer cell may be provided without any current-carrying conductors, or it may include a plurality of current-carrying conductors with an even number of cell crossings; i.e., the conductors are interwoven back and forth across the cell plane so that there is no net current passing through the buffer cell. In machine woven planes, in accordance with the present invention, a simple over and under, plain weave pattern is generally employed to provide a tighter and more uniform weave and also to simplify the requirements which are imposed on the loom used to weave the planes. However, to require the weaving of a plain weave pattern imposes certain limitations with respect to the sense of the control conductor in the storage cells, i.e., the direction in which current is passed through an individual cell. In accordance with the present invention, therefore, the weave pattern is designed to provide a predetermined number of control wires threading a storage cell, with the control wires interwoven in adjacent buffer cells as described above in order that the pattern may be repeated for the next storage cell.

In the weaving of the desired memory planes on automatic power looms, it has been found that the insulated conductors have a tendency to slip from their initial position in the mesh of the substrate wires. In accordance with an aspect of the present invention, therefore, additional conductors, which may be referred to as "dummy" or "idle" conductors, are inserted at appropriate intervals during the weaving process to increase the packing of the conductors placed between adjacent substrate wires and thus affix the insulated conductors in a predetermined position relative thereto. The resulting woven structure provides an improved dimensional stability of the individual substrate and control wires resulting in better uniformity of storage cell characteristics in the finished product. Moreover, the location of the idle conductors may be arranged to provide for crossovers at particular points in the mesh so that the desired over and under pattern may be more readily realized.

In accordance with an aspect of the invention, particular weaving arrangements are provided which make use of a skip weave pattern. In such a pattern, which is a departure from the plain weave or over-under pattern, selected wires or meshes are skipped and thus the need for dummy wires to control the threading of the respective cells is obviated. In one particular arrangement in accordance with the invention, a skip weave is employed to provide control of the phase of a sense conductor relative to the drive conductors so that cancellation of inductive noise on the sense conductor during the readout cycle is achieved.

Particular advantages accrue from the preparation of woven screen memory structures on automatic power looms in accordance with the present invention. One such advantage relates to the provision of woven structures which in particular arrangements of the invention may be woven in lengths up to 25 feet or more. Such a structure may be useful in word organized memory systems, for example, and may be stored by coiling the structure as it is fabricated, with the complete memory being formed by stacking the individual cylinders resulting from the coiling of the fabricated memory arrangements.

In accordance with a further aspect of the present invention, memory planes in accordance therewith are woven in particular patterns including the individual matrix trim which is arranged so that the various types of wires, i.e., the substrate wires and the respective types of control conductors, may be readily separated when the weaving process is completed. For example, the substrate wires are kept separate from the control conductors and may be trimmed off at the edge of the particular memory matrix. Moreover, the drive conductors may be maintained separate from sense conductors by arranging the two groups to be on opposite sides of the loom as the woven matrix leaves the loom or by providing distinct areas of separator trim in which the different types of conductors and substrate wires are variously interwoven to facilitate the separation of the different conductors. It is then a simple matter to cut the respective conductors at appropriate lengths, maintaining their respective spatial relationship, so that they may readily be arranged for connection through associated control equipment in proper order.

In the description of the invention presented herein, various weave patterns and techniques for fabricating the same are set forth in the context of so-called memory or information storage devices. It should be understood, however, that memory devices and logic devices in the magnetic art are substantially alike in structure and differ principally in function. It will be clear to those skilled in the art that the apparatus and methods of the present invention are equally adaptable to both memory and logic devices. For example, a particular cell having a plurality of conductors interwoven therein may function as a storage cell with a number of drive and sense leads in a memory matrix or as a gate or switch responsive to currents on various combinations of the threaded conductors in accordance with predetermined logic conditions. Accordingly, it should be understood that the scope of the invention is not to be circumscribed by the description thereof in the context of memory devices.

A better understanding of the present invention may be gained from a consideration of the following detailed description, taken in conjunction with the accompanying drawings, in which:

FIG. 5(*b*) is a sectional view of FIG. 5(*a*) illustrating a double separation arrangement in accordance with the invention;

Figure 1:
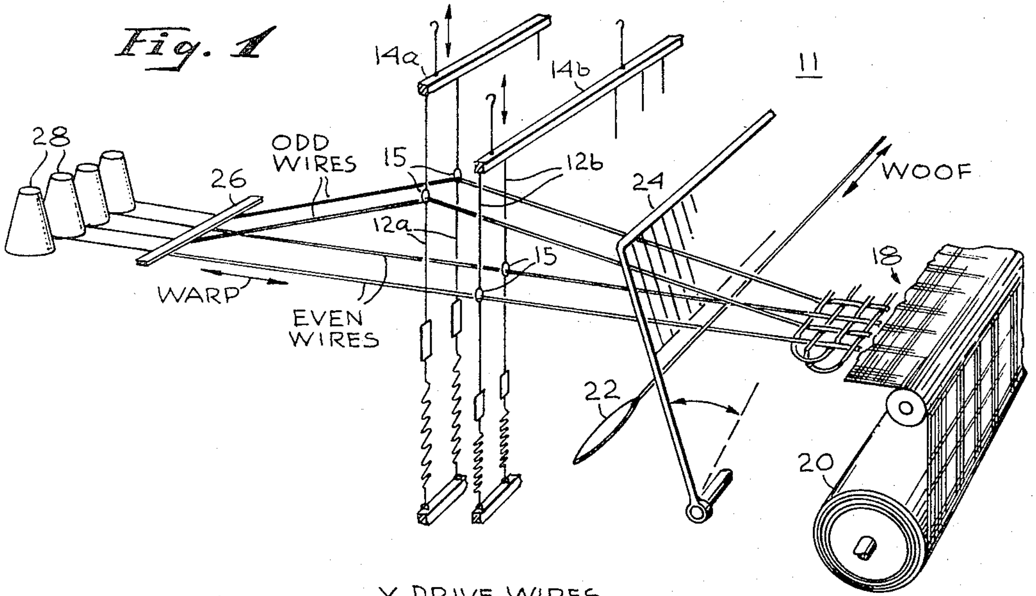
FIG. 1 is a schematic representation of a loom which may be used in the fabrication and practice of the present invention.

The loom 11, represented schematically in FIG. 1, is shown comprising a plurality of heddles, such as 12*a* and 12*b*, attached in groups to harnesses 14*a* and 14*b* for individual vertical movement therewith. Each heddle contains an aperture 15 through which the warp, or lengthwise, wires of the woven screen are individually threaded as they proceed from a plurality of individual supply spools 28. As the weaving proceeds, the woven screen material 18 is produced and wound on a take-up spool 20. In operation, a particular harness, such as 14*a*, is raised to separate the individual wires threading the apertures 15 in the heddles 12*a* from the remaining wires. A shuttle 22 is thereupon "kicked" through the region between the raised or odd wires and the even wires which remain in place in a relaxed position to develop one pass of the woof or shoot wires in a direction transverse to the warp wires of the woven screen 18. Following each pass of the shuttle 22, a reed 24 is rotated forward to tighten the recently passed shoot wire in the fabric of the screen 18. The raised harness 14*a* is then dropped to the released position, and another harness, such as 14*b*, is raised to provide for the next pass of the shuttle 22. The shuttle 22 in conventional form comprises a hollow boat which is arranged to slide back and forth carrying a bobbin of wire which is used to lay down particular shoot wires on the woven screen 18. A tension guide 26 is shown in conjunction with the plurality of supply spools 28 to maintain appropriate tension of the respective warp wires of the screen 18. Although the schematic representation of the loom 11 of FIG. 1 shows only two harnesses 14*a* and 14*b* and a single shuttle 22, it should be specifically understood that various arrangements in accordance with the present invention may involve the use of a substantial plurality of harnesses and a number of shuttles in order to provide the desired sequence of wires which comprise the woven screen 18.

Figure 2:
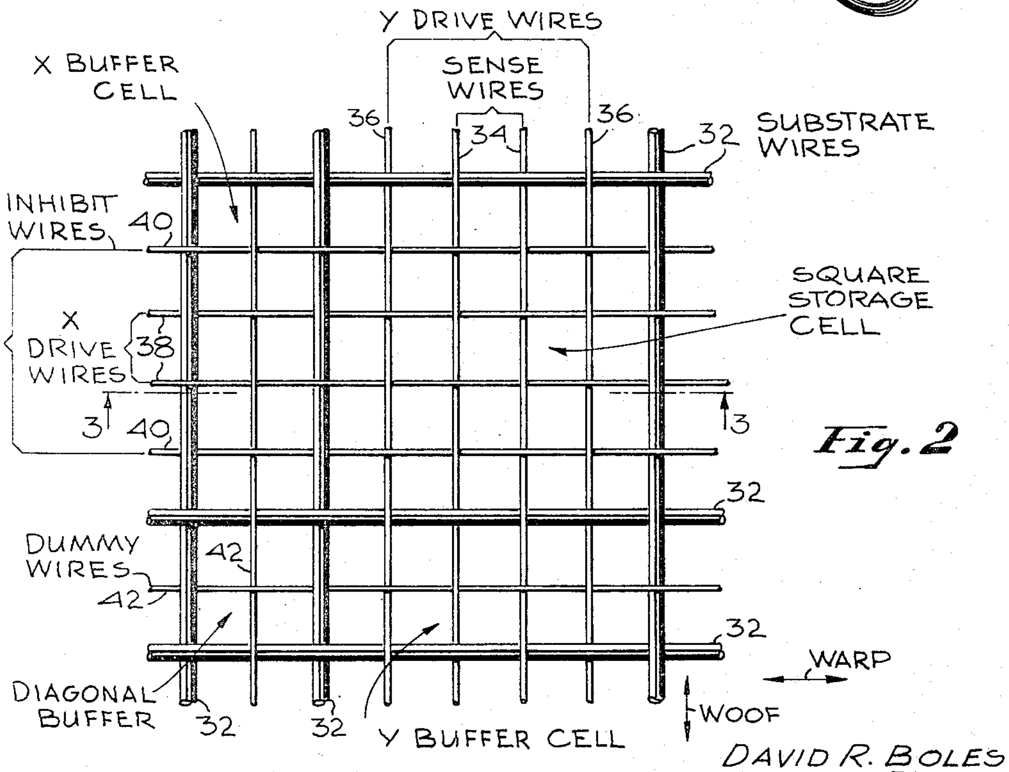
FIG. 2 is a diagram of a typical cell configuration comprising an incremental portion of a woven matrix which may be prepared in accordance with the present invention.

A typical storage cell arrangement suitable for weaving in a memory matrix in accordance with the principles of the present invention is represented in the diagram of FIG. 2, which shows a single square storage cell together with the associated buffer cells which bound the storage cell on the bottom and left-hand edges thereof and serve to provide separation and isolation of adjacent storage cells. In FIG. 2, a plurality of substrate wires 32 and control wires, variously designated sense wires 34, Y-drive wires 36, X-drive wires 38, and inhibit wires 40, are shown interwoven to form the depicted portion of a memory matrix. The substrate wires 32 may advantageously be bare copper wires which are ultimately coated with a magnetic layer to define the magnetic flux paths of a given storage cell. However, in the various embodiments of the present invention the substrate wires are not limited to bare copper wires but may be any metallic wires on which a suitable magnetic coating may be deposited. Thus, the substrate wires 32 may, for example, comprise wires of another metal than copper, or they may even be insulated wires or plastic filaments having an outer surface which is suitably treated to permit the deposition of a magnetic coating thereon. The control wires are electrical conductors which serve to carry various currents employed in the operation of devices produced in accordance with the present invention. In general, the control wires are insulated to provide the desired electrical isolation of the various wires. In addition, a pair of rummy or idle wires 42 are shown which, in accordance with an aspect of the invention, serve to provide the desired spacing between particular wires of the matrix and also may serve to control the threading of particular cells by the respective control wires.

As shown in FIG. 2, the square storage cell may comprise a single large mesh of the substrate wires 32 threaded by the control wires 34, 36, 38 and 40. The individual storage cells are separated from each other by X-buffer cells on the left and right, and Y-buffer cells at top and bottom, and by diagonal buffer cells adjacent the corners. The inclusion of the buffer cells provides the advantage of minimizing the interference or noise which may be present at a given storage cell, resulting from stray magnetic coupling to other cells in the matrix during the operation thereof. The X-drive wires 38 and Y-drive wires 36 are included for the coincident current selection of a particular storage cell in the woven screen matrix. Similarly, the inhibit wires 40 are included for use during the cell selection process to permit the utilization of various advanced coincident current selection techniques. The sense wires 34 are included for the generation of a readout signal which may be developed when a particular cell is switched during the readout process. In general, with the arrangement shown in FIG. 2, it is contemplated that the respective pairs of control wires are connected in loops at one end thereof so that a current flowing in a given control wire, such as the X-drive wire 38, for example, will flow across the storage cell and return. Such an arrangement advantageously provides the effect of two turns of a particular control wire about the given storage cell, thus developing additional magnetomotive force from a given drive current for switching the cell. By the operation of a finished woven screen matrix in accordance with techniques employed in ferrite core matrices, information may be stored in the form of binary coded digits corresponding respectively to the direction of remanent magnetization of an individual storage cell, i.e., clockwise or counterclockwise.

Figure 3:
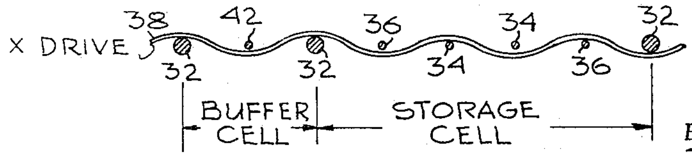
FIG. 3 is a sectional view of the incremental portion shown in FIG. 2, and taken along the line 3—3 of FIG. 2.

FIG. 3 is a sectional view taken along the line 3—3 of FIG. 2 and illustrates the use of a plain or over-under weave. In this diagram, it is evident that the X-drive wire 38 threads the particular storage cell between the substrate wires 32 but once, even though it is interwoven with the Y-drive wires 36 and the sense wires 34 of the matrix. It is important that the control wires do not thread, i.e., pass through, the buffer cells which serve to provide the desired separation and isolation of the respective storage cells. The importance of the dummy or idle wire 42 may therefore be appreciated in the plain weave, since without the wire 42 the X-drive wire 38 would be forced to thread the buffer cell shown in the diagram. Therefore, so long as a plain or over-under weave is employed, the dummy or idle wires 42 serve the dual purpose of providing spacing within the respective buffer cells and also preventing the threading of the buffer cells by the control wires which cross the buffer cells. In particular matrix patterns which may be woven in accordance with the principles of the present invention, additional dummy wires such as 42 may be woven within the storage cell portions of the matrix in order to provide the desired packing of the respective control and substrate wires, thus improving the dimensional stability of the wires in the woven structure, and also to determine the manner in which the control wires thread the storage cell. For example, the addition of a dummy wire such as 42 between the substrate wires 32 which bound the storage cell shown in FIG. 3 would change the number of wires within the storage cell mesh from an even number to an odd number. The inclusion of an odd number of warp wires, for example, in a given cell which is woven in a plain or over-under weave pattern prevents the woof wires from threading such a cell. This may be desirable in a type of memory matrix where information may be stored by the presence or absence of a sense wire threading a given cell, for example.

Figure 4:
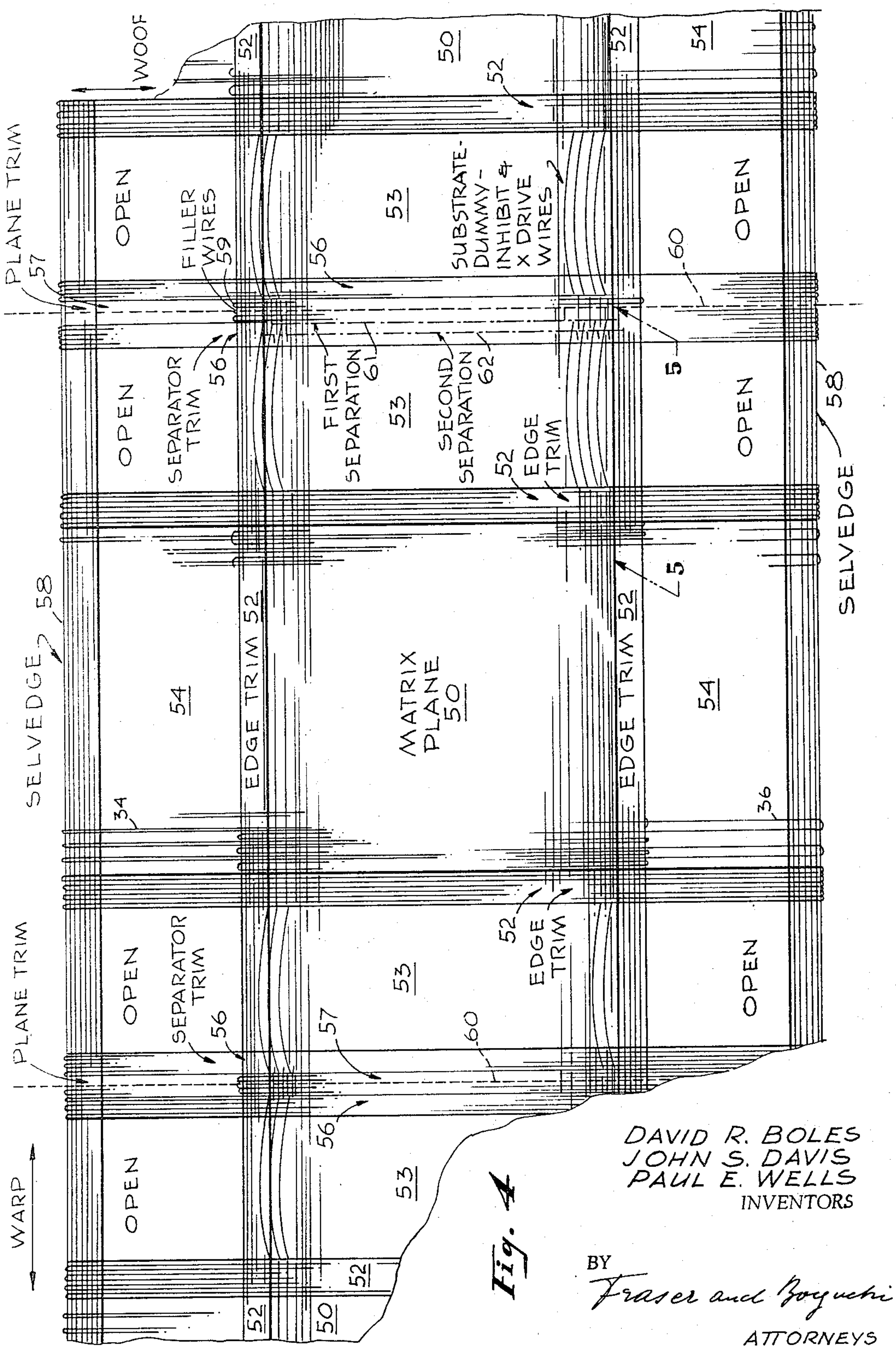
FIG. 4 is a representation of one particular embodiment in accordance with the invention.

FIG. 4 represents one particular arrangement in accordance with the invention whereby a screen memory matrix plane is woven with a particular peripheral pattern which simplifies the process of fabrication of the finished memory device. The arrangement of FIG. 4 will be described as corresponding to the individual storage cell arrangement shown in FIG. 2, although it will be understood that the principles of the invention which are represented in FIG. 4 are equally applicable to a matrix plane which is woven to provide a plurality of storage cells of various configurations.

The arrangement of FIG. 4 may be understood to comprise a matrix plane 50 including a plurality of individual storage cells and associated buffer cells, such as are shown in FIGS. 2 and 3, surrounded by edge trim portions 52. Extending outwardly from the respective edge trim portions 52 are regions 53 and 54 through which various selected wires from the matrix plane 50 are passed without being interwoven in any mesh. The arrangement of FIG. 4 is a portion of woven screen strip with the warp direction extending horizontally and the woof or shoot direction extending vertically. The cell configuration of FIG. 2 may be envisaged as oriented in a similar direction in the matrix plane 50, although, if desired, the arrangement may be rotated ninety degrees. Extending outwardly from the regions 53 in the warp direction is a section of separator trim 56 showing two distinct separation positions represented by the dot-dash lines 61 and 62; beyond the separator trim is an area of plane trim 57, following which the depicted pattern is repeated in the warp direction. The separator and plane trim portions are interwoven with a plurality of filler wires 59 extending in the woof direction to keep the warp wires from unravelling. Extending outwardly from the regions 54 in the shoot direction is the selvedge 58 which comprises the edges of the woven strip and which are also interwoven with filler wires to prevent the woven material from unravelling. In the weave pattern as shown, open areas in which no wires are present occur at the corners of the edge trim 52. Cutting lines for separating the adjacent matrices 50 are indicated by the dashed lines 60.

Figures 5A, 5B:
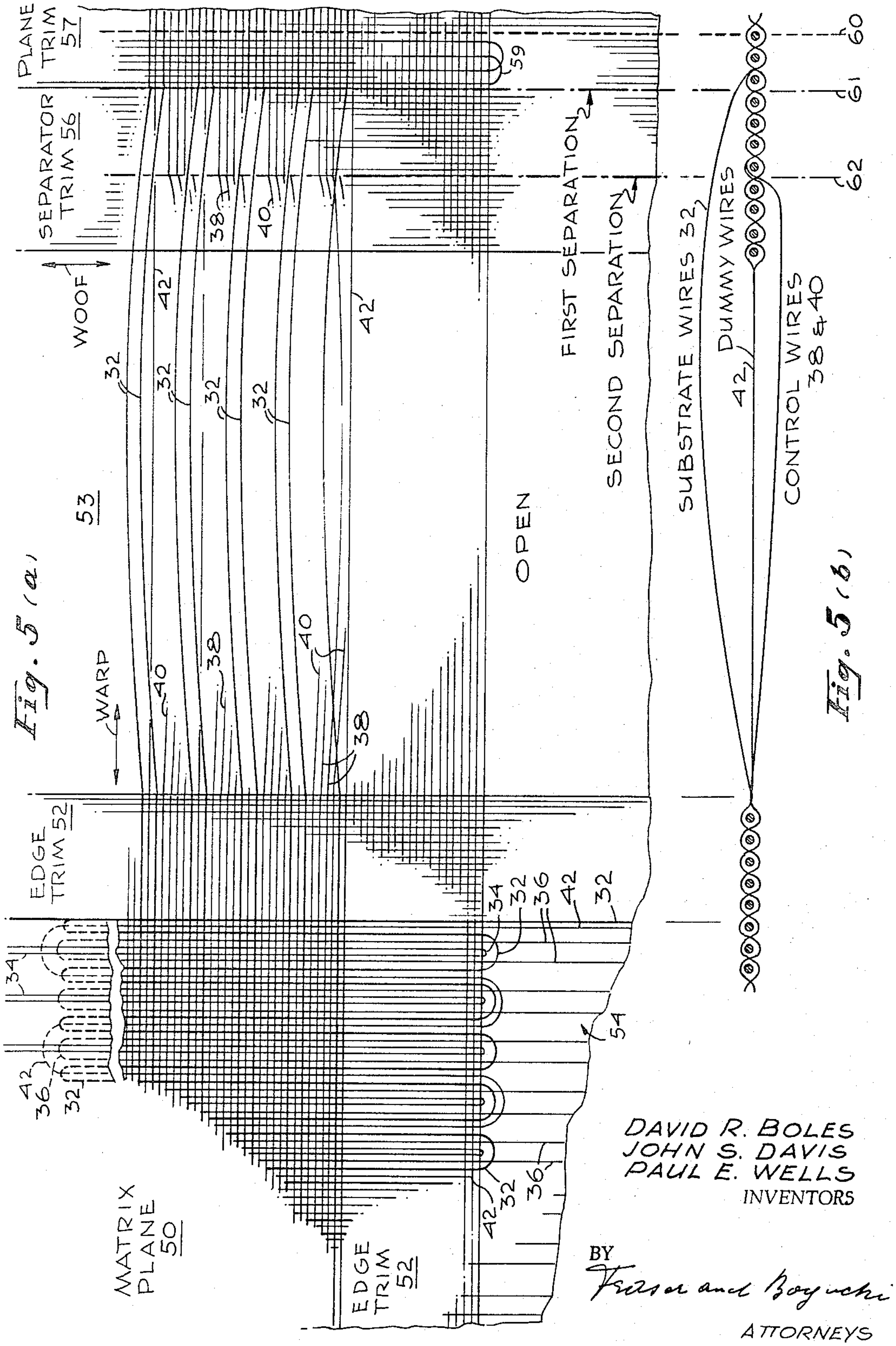
FIG. 5(*a*) is an enlarged representation of a particular portion of the embodiment shown in FIG. 4.

Particular details of the peripheral weave pattern of the matrix plane 50 of FIG. 4 are shown in FIGS. 5(*a*) and 5(*b*), which are an enlarged representation of a portion of the arrangement of FIG. 4 and a sectional view thereof, respectively. The particular configuration of the woven wires in the matrix plane 50 and the edge trim portions 52, as well as in the plane trim region 57, has been omitted for the sake of simplicity. As mentioned, it is understood that the matrix plane 50 may comprise a plurality of substrate and control wires interwoven as shown in FIG. 2. The edge trim regions 52 provide the boundary for the matrix plane 50, and the exact manner in which the various wires are interwoven in the edge trim regions 52 is unimportant so long as a tight weave is provided which insures uniformity of the matrix plane weave pattern to the very edge thereof and prevents unravelling of the matrix plane itself. In one particular arrangement of the invention, the horizontal and vertical edge trim portions 52 contain only insulated control wires interwoven in the shoot and warp directions, respectively.

As may be better seen in FIG. 5, the various wires in the warp direction are woven differently in the vicinity of the separator trim portion 56. In this region, the substrate wires 32 pass across the separator trim portion 56 without being interwoven therein, although the control wires, such as the X-drive wires 38 and the inhibit wires 40, are interwoven in the separator trim portion 56. A particular advantage accrues from this aspect of the invention, namely, that the substrate wires 32 which are to be trimmed by cutting along the outer edge of the edge trim portion 52 may easily be separated from the control wires 38 and 40 at the first separation line 61 by the simple expedient of inserting a pointed tool along the side of the separator trim 56 adjacent thereto and underneath the substrate wires 32. Once the respective wires are separated, the substrate wires may be trimmed as desired, and the remaining control wires are maintained in position by the separator trim 56 for the second separation step. In this step, the control wires 38 and 40 may be separated from the dummy wires 42. As may best be seen in FIG. 5(*b*), the control wires 38 and 40 are woven through only a portion of the separator trim 56. If desired, additional separation steps may be arranged by varying the interweaving of warp wires with the woof wires in the separator trim portion 56.

The region 54 in FIG. 5(*a*) illustrates the way in which the vertical control wires, namely, the sense wires 34 and the Y-drive wires 36, are handled at the outer edge of the warp-directed edge trim portion 52. In the depicted arrangement, the Y-drive wires 36 are shown as brought out to the lower side of the matrix plane, while the sense wires 34 are shown as looped on the lower side of the matrix plane 50 and returning therethrough to be brought out on the upper side of the matrix plane 54 for connection at the opposite edge thereof. The dummy wire 42 is shown threaded back and forth as a single wire threading the entire matrix plane 50. The substrate wires 32 in the woof or shoot direction are also shown looped back and forth across the matrix plane 50.

In the embodiment of the invention depicted in FIG. 4, each individual matrix plane 50, together with its associated fringe portions, may be cut from the woven strip by cutting along the dashed lines 60, if desired. Thereafter, the individual matrix planes 50 may be further processed as described by separating the respective wires, providing the desired electrical connections, and depositing magnetic material on the substrate wires. Alternatively, if it is desired to fold the respective matrix planes 50 in a three-dimensional array, for example, or to otherwise maintain the entire woven strip of matrix planes 50 as an integral unit so that the same X-drive wires 36 and inhibit wires 40 may be used as control wires for the entire strip, the individual matrix planes 50 are not separated from each other but are processed in a strip to provide the desired array of magnetic storage planes.

Figure 6:
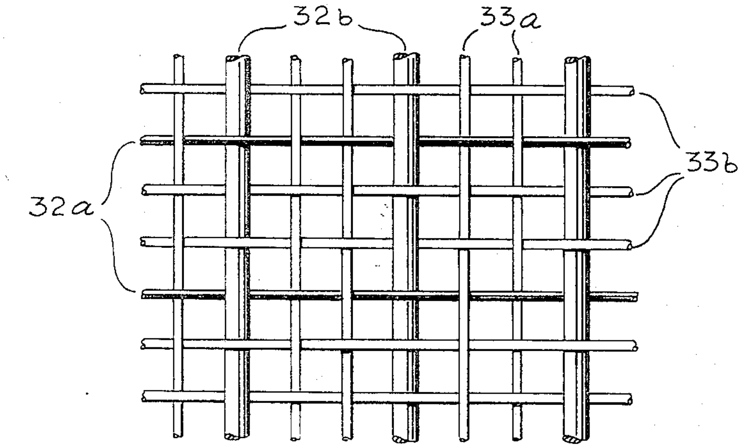
FIG. 6 is a representation of the type of cell structure resulting from one particular weave pattern which may be employed in the practice of the present invention.

FIG. 6 depicts a second particular cell configuration which may be employed in the weaving of matrix planes in accordance with the present invention. In the arrangement shown, a plurality of substrate wires **32*a* and 32*b* are shown interwoven in an orthogonal relationship together with a plurality of vertical and horizontal control wires 33*a* and 33*b*. In this configuration, the vertical substrate wires 32*b* are shown as having a substantially larger diameter than the horizontal substrate wires 32*a* in order to illustrate the versatility of the woven screen matrices in accordance with the present invention which may readily be arranged to accommodate wires of different diameter or thickness, if desired. Such larger substrate wires, when plated with a suitable magnetic material, may advantageously have a greater capacity for magnetic flux than those similar wires of smaller dimension. Alternatively, if desired, the larger wires may be fabricated with an internal conductor to provide storage cells of particular types and specialized operating capabilities. In the arrangement of FIG. 6, the buffer cells, previously shown, are omitted in order to provide a greater packing density of the storage cells in the woven memory matrix. The control wires 33*a* and 33*b* may correspond to the sense wires 34, the Y-drive wires 36, the X-drive wires 38, and the inhibit wires 40 which are shown in FIG. 2, except that each wire is threaded with only a single turn in each individual storage cell; or, alternatively, the control wires 33*a* and 33*b*** may represent a single drive wire in each orthogonal direction with the respective pairs of wires being connected together to provide two turns per cell for each wire.

Figure 7:
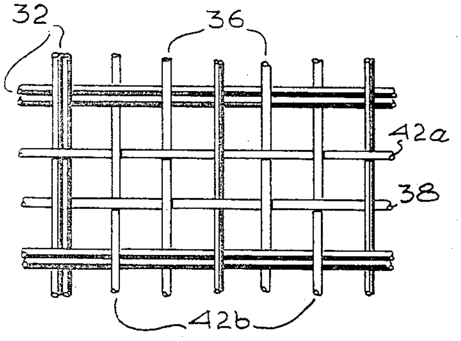
FIG. 7 is a representation of another particular cell structure resulting from a different weave pattern which may be employed in the practice of the present invention.

FIG. 7 represents a particular matrix cell configuration in which the variable width of certain selected substrate wires may readily be achieved in accordance with the method of the present invention by providing two or more substrate wires in the position where one is normally called for in the woven memory plane. In the warp direction this may be realized by threading the desired plurality of substrate wires through a single heddle. In the shoot direction, this may be accomplished by the use of a special shuttle carrying two bobbins for the substrate wires, or it may be provided by catching the substrate wire at the outside of the edge trim portion 52 and kicking the shuttle back for a second pass before the respective harnesses are shifted for the next mesh. Where the substrate wires 32 are arranged in this fashion, the subsequent coating of magnetic material thereon serves to cover the paired substrate wires 32, resulting in a storage cell having different controllable dimensions of the magnetic portions thereof along different legs around the closed flux loop of the woven substrate mesh.

Figure 8:
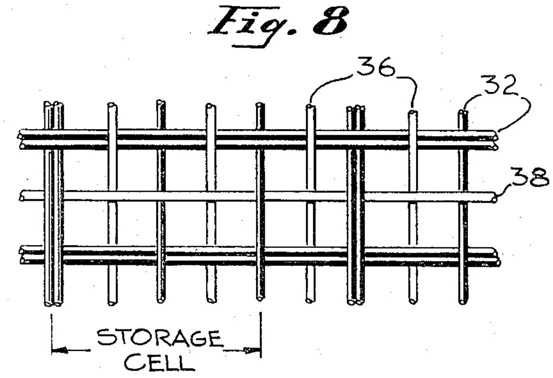
FIG. 8 is a representation of still another cell structure resulting from a different weave pattern which may be employed in the practice of the present invention.

The particular configuration of FIG. 7 represents one type of double-apertured storage cell which is of interest in specific applications. This particular arrangement may utilize a single Y-drive conductor 36 and a single X-drive wire 38 for each cell mesh, and further illustrates the use of dummy or idle wires 42*a* and 42*b* which control the threading of the respective cell apertures in the desired directions by the corresponding control wires 36, 38 when a plain weave is employed. A similar double-apertured storage cell configuration is shown in FIG. 8 which may be woven through the use of a loom arranged to provide a skip weave pattern. In such an arrangement, the dummy or idle wires 42 may be dispensed with, since the use of such a loom provides the desired control of the threading of the control wires 36 and 38 through the selected apertures. Additional wires per cell may be included, if desired, on a selective skip weave basis to provide various numbers of control wires in selected cells so that information may be stored in a predetermined pattern in a matrix of such cells in response to applied currents. Matrix driving arrangements corresponding to multi-apertured ferrite core devices may be employed in conjunction with these configurations.

Figure 9:
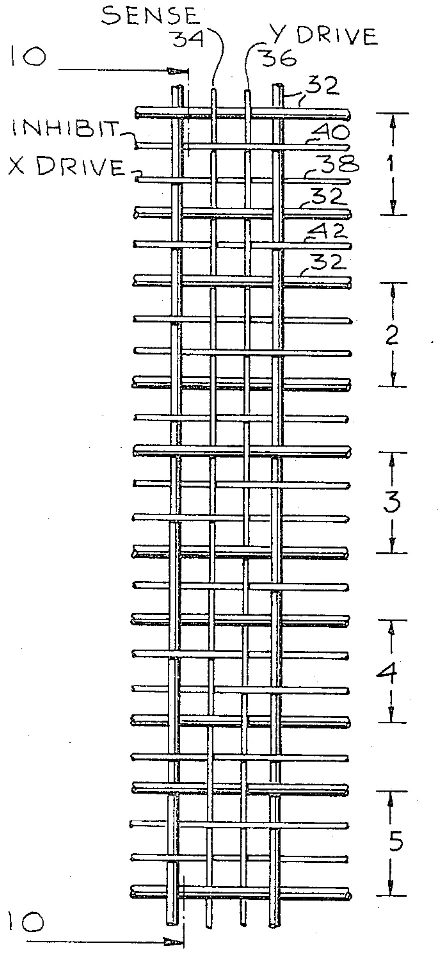
FIG. 9 is a representation of a portion of another particular arrangement in accordance with the invention showing the use of a skip weave pattern to achieve noise cancellation.
Figure 10:
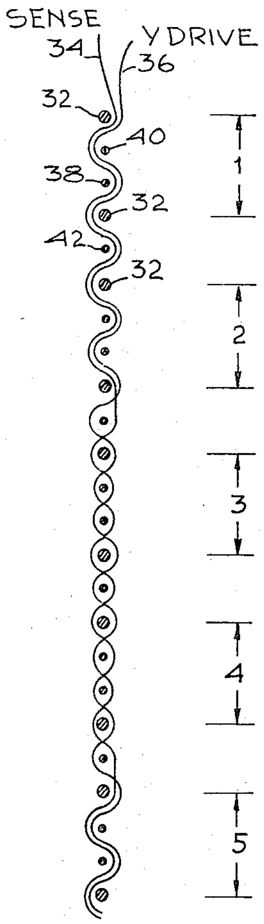
FIG. 10 is a sectional view of the arrangement shown in FIG. 9.

In the particular arrangement in accordance with the invention shown in FIGS. 9 and 10, a skip weave pattern may be used to particular advantage to achieve cancellation of inductive noise during the readout cycle and to develop bipolar readout pulses on the sense windings. In FIGS. 9 and 10, a column of storage cells, numbered 1–5, is shown together with associated buffer cells as part of a woven screen memory matrix. Each of the storage cells is shown comprising substrate wires 32, a sense wire 34, a Y-drive wire 36, an X-drive wire 38 and an inhibit wire 40. The depicted arrangement of cells 1–5 may be considered the equivalent of the storage cell arrangement shown in FIG. 2 with the modification that only single turn coupling is provided between the individual cell and the respective control wires. In the depicted arrangement, a selective skip weave pattern is utilized to develop a noise cancellation in the sense winding 34. It will be noted that the sense wire 34, which is parallel to the Y-drive wire 36, is threaded in phase therewith through the storage cells 1 and 2. As the sense wire 34 passes through the buffer cell between storage cells 2 and 3, however, it is woven so as to skip one mesh and thus becomes woven out of phase with the Y-drive wire 36 in the storage cells 3 and 4. Another mesh is skipped as the sense wire 34 passes the buffer cell between storage cells 4 and 5 so that the sense wire 34 is again in phase with the Y-drive wire 36 in threading the storage cell 5, and so on. By virtue of this arrangement, the readout pulse induced on the sense wire 34 during readout of a stored binary 1 from cells 1, 2 or 5 will be a pulse of one polarity whereas the readout of a stored binary 1 from cells 3 or 4 will develop a readout pulse on the sense wire 34 of the opposite polarity. The so-called noise pulses which are induced on the sense wire 34 from half-selected cells, that is, cells which are threaded by current on only one of the X-drive and Y-drive wires will therefore serve to cancel each other out and thereby minimize the unwanted noise. The same advantageous result can be achieved by applying the skip wave to the Y-drive wire 36, for example, instead of the sense wire 34, since it is the relative phase relationship between the two wires that is effective in achieving the noise cancellation.

Figure 11:
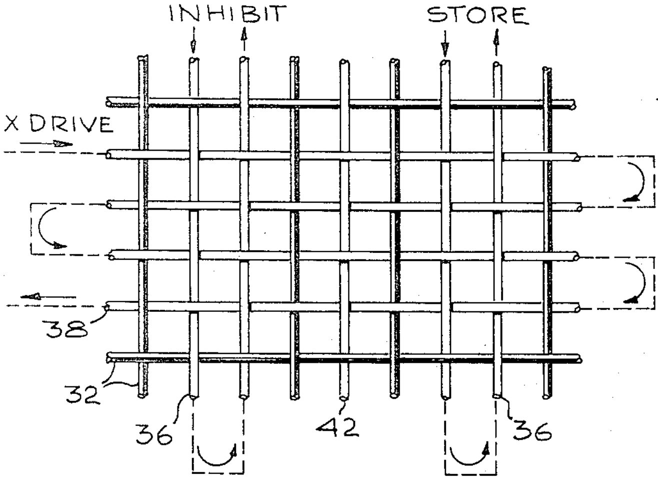
FIG. 11 is a representation of yet another cell structure resulting from a particular weave pattern in accordance with the present invention.

FIG. 11 represents a particular cell configuration in which the respective control wires in the warp and woof directions of the woven material are arranged to provide different numbers of turns with respect to the individual storage cells. The resulting weave configuration provides a non-square mesh for the individual storage cells, and if connected as indicated by the dashed lines representing the terminal portions of the woven wires, serves to provide four turns per cell in the horizontal direction and two turns per cell in the vertical direction. As shown in FIG. 11, the woven cell configuration comprises the substrate wires 32, the Y-drive wires 36, and the X-drive wire 38. Two storage cells are shown separated by a buffer cell including a dummy wire 42. In the depicted arrangement, storage of a particular bit of information, such as a binary 1, for example, may be achieved by concurrently applying an X-drive current in the direction indicated by the arrows associated with the wire 38, together with a STORE current applied as indicated to the right-hand Y-drive wire 36. As shown, the STORE current develops a magnetic field which adds to the field resulting from the X-drive current of the wire 38, so that a counterclockwise condition of magnetization is obtained in the depicted storage cell on the right-hand side of the figure. An opposite magnetization condition, which may correspond to a binary 0, is obtained for the left-hand storage cell in the figure by the application of an INHIBIT current to the associated Y-drive wire 36, which serves to oppose the field resulting from the X-drive current in the conductor 38. If, on the other hand, a binary 1 is to be stored in the left-hand storage cell, the current in the associated wire 36 is reversed in direction so that its field now aids the field developed by the X-drive current in the conductor 38. In such a case, a clockwise magnetization state is established in the left-hand storage cell corresponding to the storage of a binary 1. It will be noted that the magnetization conditions corresponding to a binary 1 in the individual storage cells depicted in FIG. 11 are in opposite directions; that is, the left-hand storage cell stores a binary 1 as a clockwise magnetization condition, whereas the right-hand storage cell stores a binary 1 as a counterclockwise magnetization condition. This is determined by the way in which the respective control wires 36 and 38 are interwoven in the individual storage cells in accordance with the present invention, and this arrangement advantageously serves to provide a certain amount of magnetic noise cancellation by virtue of the elimination of interference from one cell to the next. Readout of the stored information of the arrangement depicted in FIG. 11 may be accomplished on a word-organized basis by the application of a current in the opposite direction along the X-drive conductor 38 with the vertical conductors 36 being used during this interval as sense conductors.

Figure 12:
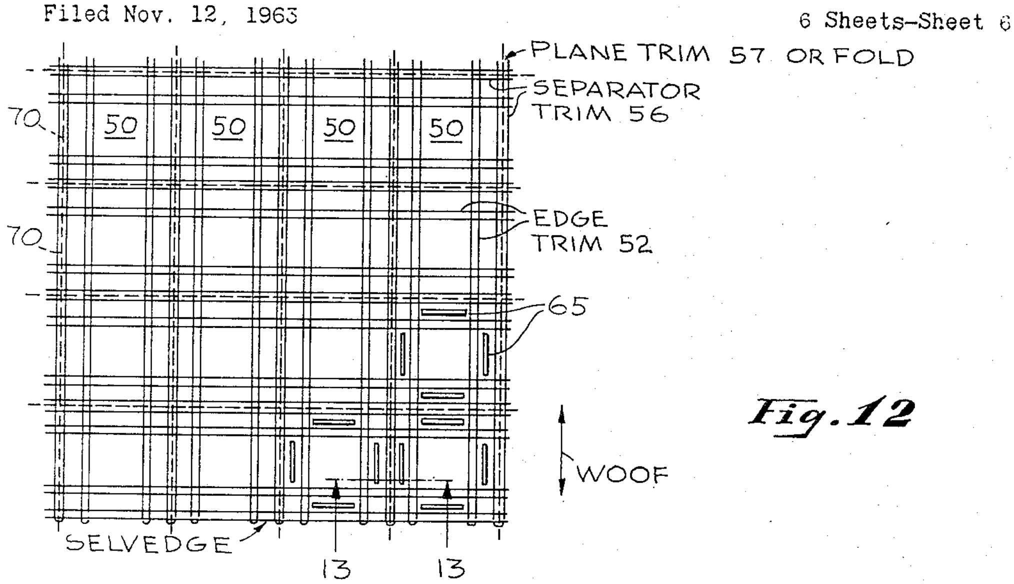
FIG. 12 is a diagram representing a particular woven configuration of a plurality of matrices arranged for folding in a stacked array in accordance with the present invention.
Figure 13:
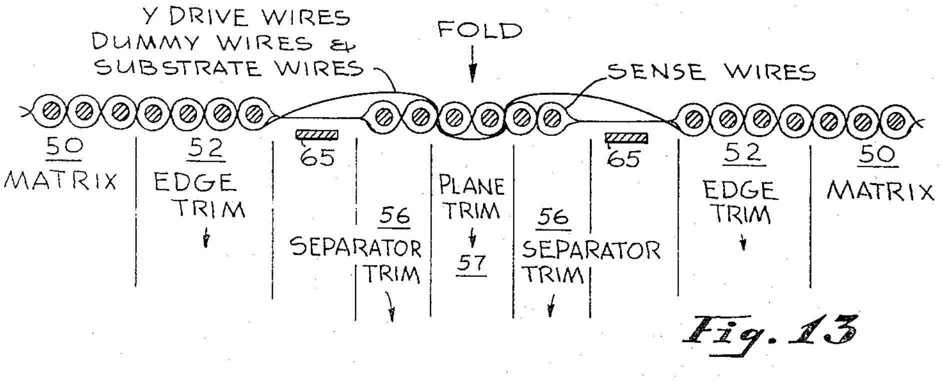
FIG. 13 is a sectional view of a portion of the embodiment shown in FIG. 11.

In cases where a loom having sufficient dimension in the woof direction is available, it may be more efficient to weave a plurality of matrix planes on a repetitive basis in both the woof and the warp directions. Such a woven array is represented by the arrangement depicted in FIG. 12, wherein each of the individual squares 70 corresponds to a weave pattern which is illustrated in FIG. 4. The arrangement shown in FIG. 12 is similar to that depicted in FIG. 4, except that the woven wires are repeated from matrix to matrix along the woof direction as well as being repeated in similar fashion along the warp direction. In place of the selvedge 58 which is shown along the very edge of the woven screen in FIG. 4, each matrix pattern is bounded by portions of separator trim 56 and plane trim 57 on each side. As is described in conjunction with FIGS. 4 and 5(*a*), the separator trim 56 is provided to facilitate the separation of the substrate and control wires which are interwoven in the matrix plane 50. Upon completion of the weaving process, if the individual matrix planes are to be divided and utilized separately, the woven material may be cut along the dashed lines indicated in FIG. 12. Alternatively, these lines may represent the points where the woven material is to be folded as indicated in FIG. 13 for stacking of the matrix planes 50, after the fabrication process is completed.

Figure 14:
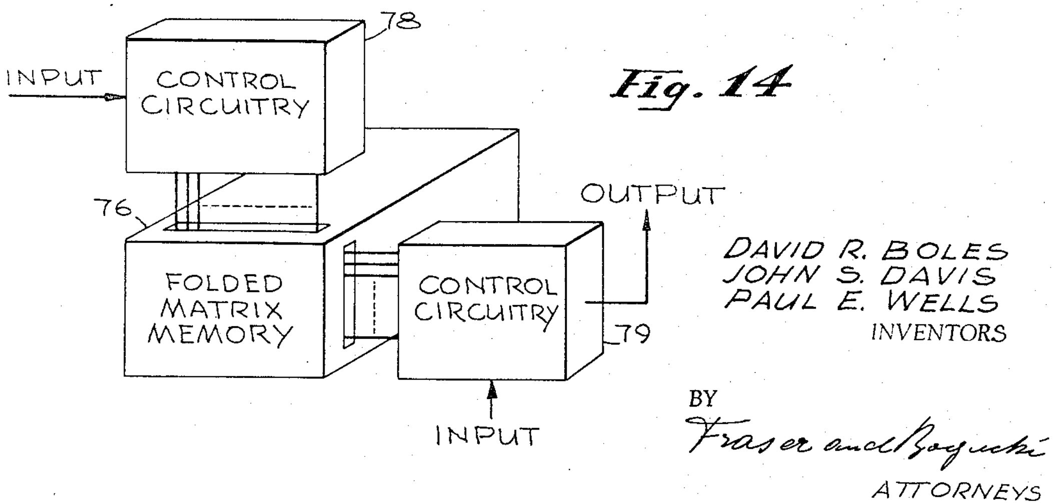
FIG. 14 is a block diagram of an arrangement for utilizing particular embodiments of the present invention.

A plurality of terminal blocks 65 are shown in position for connection to selected conductors of the matrices 50 of FIG. 12 for use in a folded or stacked array in order to provide access to the sense and inhibit wires of the individual matrix. The X-drive and Y-drive conductors are common to matrices in corresponding rows. FIGS. 14 represents a block diagram form of a folded matrix memory 76 fabricated in accordance with the present invention, to which appropriate control circuitry 78 and 79 is indicated as connected to the control wires of the matrix memory 76.

There have thus been described various arrangements in accordance with the present invention, together with preferred methods for the fabrication thereof, which serve to provide improved devices for information storage. These arrangements are compact and reliable, and may be fabricated into memory arrangements of substantial capacity at a minimum cost per unit of information stored. Although the specific methods and arrangements in accordance with the invention are described for the purpose of illustrating the manner in which the invention may be used to advantage, it will be appreciated that the invention is not limited thereto. Accordingly, any and all modifications, variations, or equivalent arrangements falling within the scope of the annexed claims, should be considered to be a part of the invention.

The embodiments of the invention in which an exclusive property or privilege is claimed are defined as follows:

1. A woven screen structure suitable for the deposition of remanent magnetic material thereon to provide a memory device comprising:

a plurality of substrate wires and a plurality of control wires interwoven to define a plurality of individual cells, each comprising a mesh of the interwoven substrate wires having selected control wires threaded therethrough; and means for permitting the ready separation of the substrate wires and the control wires at predetermined portions of the screen.

2. A woven screen structure suitable for the deposition of remanent magnetic material thereon to provide a memory device comprising:

a plurality of substrate wires and a plurality of control wires interwoven in a repetitive pattern to define a plurality of individual cells, each comprising a mesh of the interwoven substrate wires having selected control wires threaded therethrough; and means for segregating said substrate wires and control wires in distinct groups to facilitate the separation thereof.

3. A woven screen structure suitable for the deposition of remanent magnetic material thereon to provide a memory device comprising:

a plurality of substrate wires and a plurality of control wires interwoven in a repetitive pattern to define a plurality of individual cells, each comprising a mesh of the interwoven substrate wires having selected control wires threaded therethrough, a particular portion of said pattern being woven of the control wires alone so as to permit the ready separation of the substrate and the control wires thereat.

4. A woven screen structure suitable for the deposition of remanent magnetic material thereon to provide a memory device comprising:

a plurality of substrate wires and a plurality of control wires interwoven to define a plurality of individual cells, selected ones of said cells comprising a mesh of the interwoven substrate wires having selected control wires threaded therethrough in order to define information storage cells;

means for providing buffer cells interspersed among said storage cells to isolate each of the storage cells; and means for preventing the interwoven control wires from threading said buffer cells in a plain over and under weave.

5. A woven screen structure suitable for the deposition of remanent magnetic material thereon to provide a memory device comprising:

a plurality of substrate wires and a plurality of control wires interwoven to define a plurality of individual cells, certain of said cells comprising a mesh of the woven substrate wires having selected control wires threaded therethrough to define information storage cells;

means for providing buffer cells interspersed among said storage cells to isolate each of the storage cells; and at least one idle wire spaced between the substrate wires of the buffer cells in a predetermined arrangement to prevent adjacent control wires from threading a buffer cell.

6. A woven screen structure suitable for the deposition of remanent magnetic material thereon to provide a memory device comprising:

a plurality of substrate wires and a plurality of control wires interwoven to define a plurality of individual cells, each comprising at least one mesh of the interwoven substrate wires having selected control wires threaded therethrough; and a plurality of idle wires interspersed with the control wires between adjacent substrate wires bounding a particular individual cell for determining the relative position of the control wires therein.

7. A woven screen structure suitable for the deposition of remanent magnetic material thereon to provide a memory device comprising:

a plurality of substrate wires and a plurality of control wires interwoven to define a plurality of individual cells, each comprising at least one mesh of the interwoven substrate wires having selected control wires threaded therethrough; and a plurality of idle wires interspersed with the control wires between adjacent substrate wires bounding a particular individual cell for determining the number of times a cell is threaded by the adjacent control wires.

8. A woven screen suitable for use in a memory device comprising:

a repetitive pattern having a first portion of interwoven substrate wires and control wires defining a plurality of cells;

an edge trim portion extending about the periphery of the first portion to bind the edges thereof;

a plurality of unwoven areas extending along said edge trim portion remote from said first portion; and a separator trim portion extending outwardly of at least one of said woven areas through which only selected ones of said wires are interwoven to permit the separation of selected wires from the remaining wires adjacent the separator trim portion.

9. A woven screen suitable for use in a memory device comprising:

a repetitive pattern having a first portion of interwoven substrate wires and control wires defining a plurality of cells;

an edge trim portion extending about the periphery of the first portion to bind the edges thereof;

a plurality of unwoven areas extending along said edge trim portion remote from said first portion; and a multiple separator trim portion extending outwardly of at least one of said woven areas having sections through which only different selected ones of said wires are interwoven respectively to permit the successive separation of selected wires from the remaining wires.

10. A woven memory structure comprising:
a plurality of substrate wires and a plurality of control wires interwoven to define a matrix plane of storage cells, the structure employing a skip weave pattern to provide a relative phase reversal periodically between selected ones of the control wires extending in the same direction in order to provide the cancellation of induced noise voltages appearing on one of said control wires.

11. A woven screen memory structure comprising:
a plurality of substrate wires and a plurality of control wires interwoven to define a matrix plane of storage cells, said control wires including a sense wire and a Y-drive wire threading a succession of storage cells together, said sense wire being woven in said structure with a periodic skip weave in order to reverse the direction in which the cells are threaded relative to the Y-drive wire in order to provide induction noise cancellation and to develop bipolar readout pulses.

12. A woven screen memory structure comprising:
a plurality of substrate wires and a plurality of control wires interwoven to define a matrix of storage cells, selected ones of said control wires being looped in the vicinity of the edges of the matrix and returned through the storage cells to provide a plurality of turns of a given control wire in an individual cell; and
a woven pattern of trim portions about the periphery of the matrix to determine the spatial relationship of the control wires in order to facilitate electrical connection thereto.

13. A woven screen arrangement comprising:
a plurality of control conductors and a plurality of substrate wires interwoven in a repetitive pattern extending along the warp direction of the weave, each repeated pattern comprising a matrix of individual cells interwoven from said wires;
an edge trim portion extending around the periphery of the matrix to prevent the unravelling of the wires in the matrix; and
a separator trim portion positioned outwardly from the edge trim portion and being woven of only selected ones of said wires with the remaining wires bypassing the separator trim portion.

14. A woven screen structure in accordance with claim 13 and further comprising:
a plain trim portion extending outwardly from the separator trim portion and being woven of the wires interwoven in the separator trim portion and the wires bypassing the separator trim portion.

15. A woven screen structure comprising:
a plurality of substrate wires and a plurality of control wires interwoven in a repetitive pattern with the pattern being repeated in both warp and woof directions, each individual pattern comprising a matrix of individual storage cells interwoven from the respective wires;
an edge trim portion extending outwardly from the matrix around the periphery thereof for binding the edges of the matrix; and
a separator trim portion positioned outwardly from the edge trim portion to facilitate the separation of the respective substrate and control wires.

16. A woven screen structure comprising:
a plurality of substrate wires and a plurality of control wires interwoven to define a plurality of matrices of individual cells, the respective substrate and control wires extending from matrix to matrix in a manner which permits the folding of the structure between adjacent matrices to provide a three-dimensional stacked array storage device.

17. A woven screen memory structure comprising:
a plurality of substrate wires and a plurality of control wires interwoven to define a matrix of storage cells, said structure comprising in selected portions thereof a plurality of substrate wires positioned together so as to be coated by a common layer of magnetic material and thus provide flux paths having a greater flux carrying capacity than is provided by a single substrate wire.

18. A matrix comprising:
a cellular woven structure comprising a plurality of spaced cells,
a plurality of conductive threads woven through each of said cells,
an edge trim positioned adjacent at least one side of said matrix,
separator trim means to separate out selected said conductive threads from the remaining conductive threads, and
means to enable attachment of components to said separated out conductive threads.

19. The apparatus of claim 18 including external connector means to externally connect selected conductive threads of said separated out conductive threads.

20. A matrix comprising;
a cellular woven structure comprising a plurality of spaced cells,
a plurality of conductive threads woven through each of said cells,
an edge trim positioned adjacent at least one side of said matrix,
separator trim means to separate out selected said conductive threads from the remaining conductive threads,
means to enable attachment of terminal boards to said separated out conductive threads, and
external connector means to externally connect selected conductive threads of said separated out conductive threads.

21. A screen memory device comprising
a matrix of storage cells, said matrix further comprising a plurality of interwoven substrate wires and control wires,
said memory device further comprising a first portion and a second portion;
said first portion comprising a weave of selected ones of said wires extending outwardly from at least one edge of said matrix, the remaining ones of said wires extending from the said one edge of said matrix to bypass said first portion,
said second portion being adjacent said first portion and comprising a weave of all of the wires extending outwardly from said matrix edge.

22. A screen memory structure comprising
a matrix of individual cells comprising a plurality of substrate wires and a plurality of control wires woven in a pattern,
said wires extending outwardly from said matrix,
an edge portion comprising a weave of said control and substrate wires around the periphery of the matrix to bind the respective wires as they extend outwardly from the matrix,
a separator trim portion comprising only selected ones of the respective woven wires extending in a vicinity of the matrix,
a plane trim portion comprising all the wires in said vicinity extending past the separator trim portion, and
repetitively arranged further matrix edge, separator trim and plane trim portions repeated in at least one direction of the weave so that the woven structure may be folded at selected points to provide a plurality of matrices threaded by the same control wires in said one direction.

23. A screen memory structure comprising
a plurality of substrate wires and a plurality of control wires woven in a pattern extending in both warp and woof directions of weave to define a matrix of individual storage cells,
an edge trim portion woven to extend about the periphery of said matrix,
a separator trim portion including only selected wires woven to extend outwardly of said edge trim portion, and
a plane trim portion woven to include all of the wires passing said separator trim portion;
said woven pattern further comprising a plurality of additional matrices repetitively woven such that all of the matrices extending in a given direction share common control wires.

References Cited

UNITED STATES PATENTS

| | | | |
|---|---|---|---|
| 3,238,822 | 3/1966 | Davis et al. | 340—174 |
| 3,221,312 | 11/1965 | MacLachlan | 340—174 |
| 3,300,767 | 1/1967 | Davis et al. | 340—174 |
| 3,309,681 | 3/1967 | Boles et al. | 340—174 |

BERNARD KONICK, *Primary Examiner.*

TERRELL W. FEARS, JAMES W. MOFFITT, *Examiners.*

P. SPERBER, *Assistant Examiner.*